July 7, 1925.
J. ABREY
SPRING CONNECTION
Filed May 23, 1919
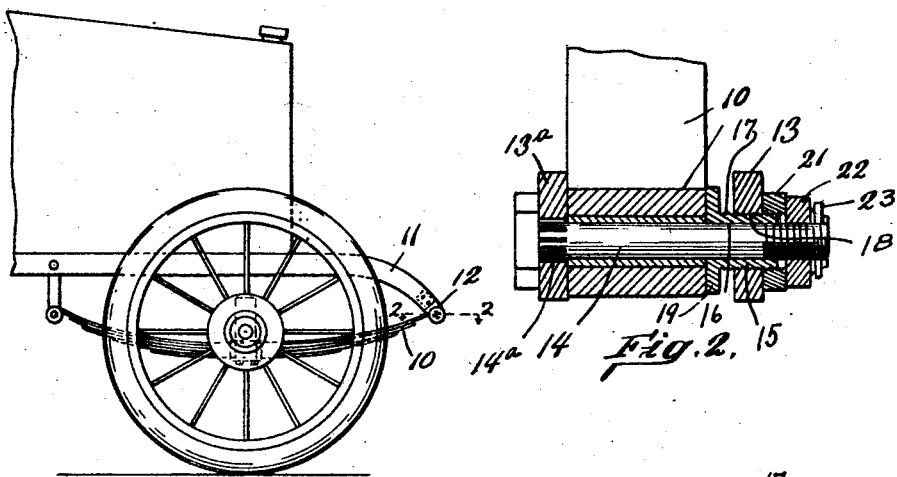
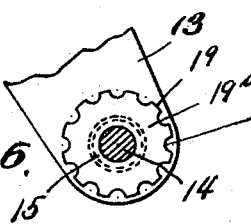
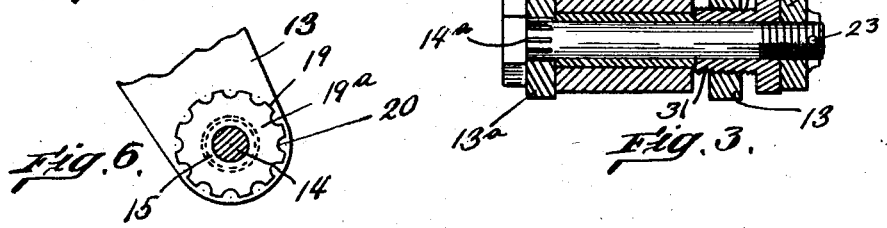
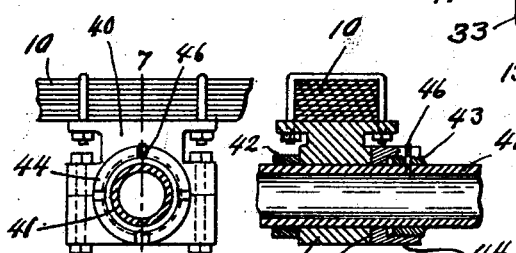
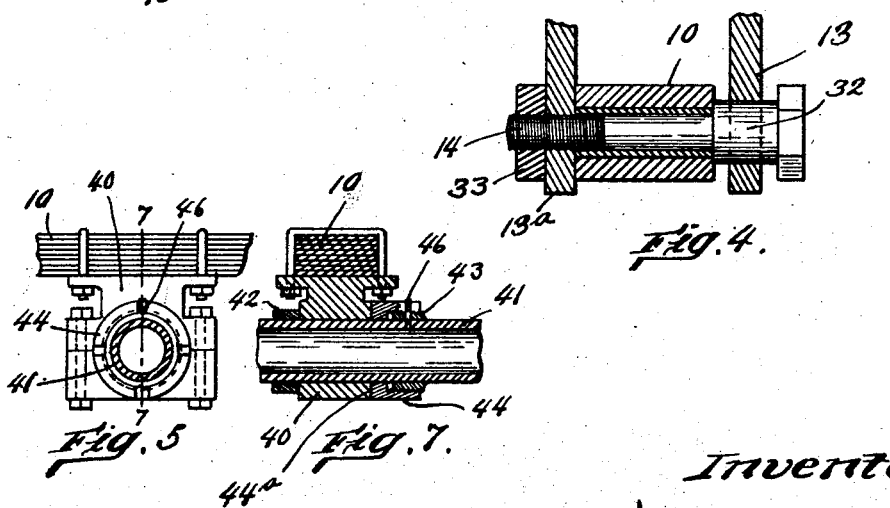
Inventor.
John Abrey
by
B. J. Noyes atty Patented July 7, 1925.

1,545,299

UNITED STATES PATENT OFFICE.

JOHN ABREY, OF BROOKLINE, MASSACHUSETTS.

SPRING CONNECTION.

Application filed May 23, 1919. Serial No. 299,158.

*To all whom it may concern:*

Be it known that I, JOHN ABREY, a subject of the King of Great Britain, and resident of Brookline, in the county of Norfolk and State of Massachusetts, have invented an Improvement in Spring Connections, of which the following is a specification.

This invention relates to automobiles and the like and has more particular reference to a spring-hanger or connection by which the automobile spring is connected to the frame of the machine, or equivalent.

In the usual type of spring, as for instance, the semi-elliptic front axle spring, the forward end or eye thereof is received between the depending side-portions of the spring horn secured to the automobile frame and held in place by a spring-supporting bolt passing through such side-portions and the end of the spring. The spring connection with other types of springs and other locations thereof is identical in principle.

The end of the spring is adapted to be so snugly received between said side-portions as to prevent any side-movement of the spring of the car, although the spring is free to oscillate upon its bolt.

While the snug fit of the spring between the side-members may obtain when the car is new, as the car is used wear takes place therebetween, so that the spring is permitted to slide on its bolt between said side-portions, and this wear and the permitted sliding motion is usually considerable or soon becomes so.

Serious results follow from this side-play of the spring. When the car turns a corner or suddenly deviates from its course such side-play causes a most disagreeable side swing or "slap" of the car to occur. Springs also, and frequently, become broken, as well as other components of the running gear of the vehicle.

The usual manner of taking up this play between the spring and its end connections, or equivalent, is by inserting shims or washers of the requisite thickness between a face of the spring and the side-portions of the spring hanger or connection. This is a difficult procedure because of the relatively small clearance between the spring and side-members, and the usual warped and thereby dis-aligned condition of the springs. Unless shims of thickness sufficient to take up practically all of the side-play are used, rapid wear occurs and the taking-up process must be again performed; and, in any event, the shims must be periodically increased in thickness.

The object of my invention is the provision of an adjustable spring-hanger or connection in which wear between it and the spring and which results in side-play of the spring may be easily and positively taken up as developed, by a simple adjustment; and the hanger or connection in which my invention is incorporated includes two spaced-apart side-portions between which the spring is adapted to be received, one of which side-portions is adjustable or movable relative to the other side-portion whereby the distance between said side-portions may be decreased, to cause the spring and side-portions to more closely engage, thereby to eliminate the side-play.

Fig. 1 is a detailed side view of the front axle and spring connection with the frame of an automobile, incorporated in my invention.

Fig. 2 is a sectional elevation along line 2—2 of Fig. 1, illustrating a preferred embodiment of my invention.

Figs. 3 and 4 illustrate modified forms of my invention.

Fig. 5 illustrates my invention as applied to the connection between a spring and a tubular rear axle of an automobile.

Fig. 6 is a face view of the adjustable bushing.

Fig. 7 is a detail of the connection of Fig. 5 along lines 7—7 of Fig. 5.

As here shown, my invention is applied to the connection between the front and semi-elliptic spring 10 and the frame or horn 11 of an automobile. The connection includes a member 12 riveted or otherwise secured to the frame or horn 11 having two extended or depending, spaced-apart side-portions 13 and 13$^a$ between which the spring is received and rotatably supported by the spring-supporting bolt 14.

In the preferred embodiment of my invention illustrated in Fig. 2, the spring 10 is supported on the bolt 14 relative to which it is permitted the usual slight amount of angular movement. Said bolt is extended through the side-portions 13 and 13$^a$ of the connection and in one of said side-portions, as 13$^a$, is a driving fit, for which purpose said bolt, near the head thereof, is formed with a plurality of longitudinal ridges 14$^a$ which, in the application of the bolt to the connection, are forcibly driven into the material composing the side-portion 13ª around the bolt opening therein, as is common practice.

The space between the side-portions 13 and 13ª is made somewhat greater than the width of the spring 10 at its eye-portion, which is received between said side-portions, for the purpose of receiving the adjusting member by which the wear which results in the objectionable side-play of the spring may be taken up as developed.

The adjusting member comprises the bushing 15 having an opening 16 therein through which the spring-supporting bolt 14 is extended, and an exteriorly threaded-portion 17 which is received in the threaded opening 18 of the side-portion 13 of the spring hanger or connection.

Said bushing 15 extends into the spring-receiving space of the hanger or connection and terminates in a radially-extended flange-portion 19 having a spring-engageable face 19ª against which the side of the spring is adapted to contact to be thereby restrained against side-play on the bolt 14. The spring-engageable face 19ª is adapted to have relatively great bearing surface to the better resist wear, and the bushing, or that portion thereof having said face 19ª, may be made of suitable wear-resisting material or so treated as to resist wear. The flange 19 extends beyond the spring 10 and terminates in a peripheral portion having recesses or notches 20 by which the bushing may be conveniently rotated in the side-portion 13 to thereby move it axially on the bolt 14 to take up the wear between the spring and the connection.

Said bushing 15 extends beyond the outside of the side-portion 13 of the connection and a check-nut 21 threaded thereon and engageable with the outer face of said side-portion serves to lock the bushing, or adjustable component of the connection, in any adjusted position.

The spring-supporting bolt 14 extends beyond said bushing and terminates in a threaded portion on which the castellated nut 22 is received by which the bolt 14 is retained in place in the connection. Said check-nut 21 is adapted to extend beyond the end of said bushing 15 and the nut 22 is adapted to engage therewith whereby to lock said check-nut 21 and castellated nut 22 to the side-portion of the connection. The castellated nut 22 may be locked to said bolt 14 by the usual cotter pin 23.

In the modification illustrated in Fig. 3, the adjustable component of the connection comprises the bushing 31 which extends through the side-portion 13 from the outside and has an enlarged outside portion 31' by which it may be suitably engaged to be rotated within said side-portion to take up the side-play of the spring.

In the modification illustrated in Fig. 4, the spring-supporting bolt 14 is formed with an enlarged or shoulder-portion 32 which is slidably received in the side-portion 13 of the connection to engage with the spring. The bolt is screw-threaded in the other side-portion 13ª and locked in adjusted position by the nut 33. In this modification, the rotation of the bolt 14 causes the shoulder-portion 32 thereof to approach the side-portion 13ª of the connection to thereby reduce the clearance between the connection and the spring.

In Fig. 5 I have illustrated my invention as applied to the connection between a spring and the rear-axle of the automobile. The spring 10 is supported on a saddle 40 which is angularly movable on the tubular housing 41 of the rear axle. In this case, the rear axle comprises the connection. A collar 42 is fixed about said housing 41 engageable with the saddle 40 and comprises a side-portion of the connection. An exteriorly-threaded collar or sleeve 43 is secured to said housing 41 on the other side of said saddle 40. An interiorly-threaded ring 44 having a saddle- or spring-engaging face 44ª is adjustably threaded on said collar or sleeve 43. The spring is restrained on said housing between the collar 42 and ring 44 and wear between said spring and the connection may be taken up by the adjustment of said ring 44 on its sleeve 43. Said ring may be locked in place by any suitable means, as by pins 46 passed through registering openings in said ring and sleeve.

It is obvious that wear occurring between the spring and the connection may be taken up by rotating the adjusting member to move its spring-engaging face nearer the other side-portion of the connection.

Various other modifications of my invention may be made without departing from the spirit of my invention.

I claim:

1. The combination of a spring having an eye, a fixed supporting member to which the spring is to be connected, said supporting member having projections formed with holes therein for the reception of a bolt, means to support said spring comprising a round bolt passed through the holes in said supporting member and through the eye in said spring and constructed and arranged to engage the inner face of said eye throughout its extent and support it while permitting it to move axially in supporting engagement with said bolt, means to fix said bolt in said supporting member against rotation, and means to support said spring against axial movement along said body comprising a bushing disposed over said bolt and received in one of the holes of said fixed supporting member and having a screw-threaded connection with said supporting member whereby it may be moved toward said spring eye, said bushing having a flat inner end extended toward said spring eye to engage and hold it against axial movement without affecting the bearing engagement between said spring eye and bolt.

2. The combination of a movable member having an eye, a fixed supporting member to which the movable member is to to be connected, said supporting member having projections formed with holes therein for the reception of a bolt, means to support said movable member comprising a round bolt passed through the holes in said supporting member and through the eye in said movable member and constructed and arranged to engage the inner face of said eye throughout its extent and support it while permitting it to move axially in supporting engagement with said bolt, means to fix said bolt in said supporting member against rotation, and means to support said movable member against axial movement along said body comprising a bushing disposed over said bolt and rceived in one of the holes of said fixed supporting member and having a screw-threaded connection with said supporting member whereby it may be moved toward the eye of said movable member, said bushing having a flat inner end extended toward said eye to engage and hold it against axial movement without affecting the bearing engagement between said eye and bolt.

In testimony whereof, I have signed my name to this specification, in the presence of two subscribing witnesses.

JOHN ABREY.

Witnesses:
T. T. GREENWOOD,
H. B. DAVIS.